United States Patent [19]

Bi et al.

[11] 4,404,111
[45] Sep. 13, 1983

[54] N,N-DIMETHYLACRYLAMIDE/2-ACRYLAMIDO-2-METHYLPROPANE SULFONIC ACID COPOLYMERS FOR ENHANCED PETROLEUM RECOVERY

[75] Inventors: Le-Khac Bi; Mary E. Dillon; Clyde Sharik, all of West Chester, Pa.

[73] Assignee: Atlantic Richfield Company, Los Angeles, Calif.

[21] Appl. No.: 232,456

[22] Filed: Feb. 6, 1981

[51] Int. Cl.$^3$ .............................................. E21B 43/22
[52] U.S. Cl. ................................ 252/8.55 D; 166/275; 526/287
[58] Field of Search ................... 252/8.55 D; 166/273, 166/274, 275

[56] References Cited

U.S. PATENT DOCUMENTS

| | | | |
|---|---|---|---|
| 3,216,962 | 11/1965 | Gatza | 260/29.6 |
| 3,230,201 | 1/1966 | Hart et al. | 260/77.5 |
| 3,282,337 | 11/1966 | Pye | 166/9 |
| 3,352,358 | 11/1967 | Williams | 166/9 |
| 3,399,725 | 9/1968 | Pye | 166/9 |
| 3,406,754 | 10/1968 | Gogarty | 166/9 |
| 3,467,187 | 9/1969 | Gogarty | 166/273 |
| 3,679,000 | 7/1972 | Kaufman | 166/273 |
| 3,804,173 | 4/1974 | Jennings | 166/275 |
| 4,254,249 | 3/1981 | Cottrell et al. | 252/8.55 |

OTHER PUBLICATIONS

McCormick, Neidlinger, Hester, Wildman, "Improved Polymer for EOR, Synthesis & Rheology", Apr.–Jun. 1980, pp. 1–37.

*Primary Examiner*—Herbert B. Guynn
*Attorney, Agent, or Firm*—Dennis M. Kozak

[57] ABSTRACT

A N,N-dimethylacrylamide/2-acrylamido-2-methylpropane sulfonic acid copolymer is disclosed. The copolymer is particularly suitable for use as a viscosity control agent in an aqueous composition employed to facilitate petroleum recovery from subterranean petroleum bearing formations.

1 Claim, No Drawings

N,N-DIMETHYLACRYLAMIDE/2-ACRYLAMIDO-2-METHYLPROPANE SULFONIC ACID COPOLYMERS FOR ENHANCED PETROLEUM RECOVERY

This invention relates to petroleum recovery.

More specifically, this invention relates to a method for enhancing petroleum recovery from subterranean petroleum deposits by water-flooding techniques.

In one of its more specific aspects this invention pertains to an N,N-dimethylacrylamide/2-acrylamido-2-methylpropane sulfonic acid copolymer suitable for use as a viscosity control agent to facilitate petroleum recovery.

As is well known, water flooding has proved to be a practical secondary petroleum recovery method after the primary recovery step based on natural pressure in the reservoir. However, even after water flooding, much petroleum still remains trapped in the pore space of reservoir rocks. Accordingly, to enhance the efficiency of water flooding, a water soluble polymer is typically added to the water to increase the viscosity of the aqueous phase and thus decrease the mobility differences between the injected water and the petroleum.

In recent years a number of partially hydrolyzed polyacrylamides have become available for use to enhance petroleum recovery. While these partially hydrolyzed polyacrylamides provide viscosity control in pure water, they become substantially less viscous in brine.

The present invention provides a water soluble copolymer which is particularly suitable for use to enhance petroleum recovery in that it exhibits excellent viscosity retention in brine.

According to this invention, there is provided a copolymer comprising N,N-dimethylacrylamide in an amount within the range of from about 70 to about 99.5 weight percent and 2-acrylamido-2-methylpropane sulfonic acid in an amount within the range of from about 0.5 to about 30 weight percent.

Also according to this invention, there is provided a process for recovering petroleum from a subterranean petroleum bearing formation which comprises injecting into the formation through an input well an aqueous composition having dissolved therein a polymeric agent whereby petroleum is displaced in the formation toward at least one input well, the improvement comprising using as the polymeric agent, a random polymer having the formula:

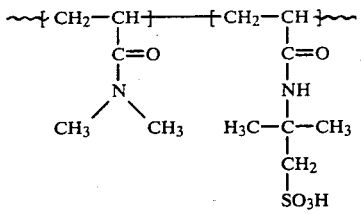

As used herein, the term "high molecular weight" is understood to mean a weight average molecular weight greater than about one million.

In the preparation of the copolymer of this invention, N,N-dimethylacrylamide monomer is employed in an amount within the range of from about 70 to about 99.5 weight percent. Preferably, N,N-dimethylacrylamide will be employed in an amount of from 98 to 99 weight percent.

In the preparation of the copolymer of this invention, 2-acrylamido-2-methylpropane sulfonic acid monomer is employed in an amount within the range of from about 0.5 to about 30 weight percent. Preferably, 2-acrylamide-2-methylpropane sulfonic acid will be employed in an amount of from 1 to 2 weight percent.

The 2-acrylamido-2-methylpropane sulfonic acid monomer employed in the examples is designated AMPS TM Monomer, and is commercially available from Lubrizol Corporation.

As the polymerization initiator, any suitable free radical initiator soluble in water can be employed. Ammonium persulfate has been found to be a particularly suitable initiator for use when polymerization is conducted at low temperatures—below about 15° C. The amount of initiator employed will typically be within the range of $10^{-4}$ to $10^{-5}$ mole/liter range. At concentrations below $10^{-5}$ mole/liter no significant improvement in the viscosities of the resultant polymers was obtained.

Polymerization temperature has been found to affect the molecular weight of the resulting copolymers. Polymerizing at a temperature less than about 15° C., preferably 0° to 5° C. facilitates the production of high molecular weight copolymers.

The preferred polymerization solids content was found to be within the range of from about 10 to about 30 weight percent, preferably 15 to 25 weight percent solids. A solids content greater than about 30 weight percent was found to result in poor solubility.

The following examples demonstrate the preparation of the copolymers of this invention in aqueous solution.

EXAMPLE I

This example demonstrates the purification of a N,N-dimethylacrylamide monomer containing 300 ppm of methylethyl hydroquinone stabilizer, designated "SIPOMER NNDMA" commercially available from Alcolac, Inc.

N,N-dimethylacrylamide was exposed over calcium hydride for about 24 hours to remove the methyl-ethyl hydroquinone stabilizer and a few parts per million of sym-di-Beta-naphthyl-p-phenylene diamine designated "Age Rite White" a high boiling stabilizer commercially available from R. T. Vanderbilt Company were added.

The N,N-dimethylacrylamide was then purified by distillation under vacuum. The resulting purified N,N-dimethylacrylamide monomer was employed in the subsequent Examples.

EXAMPLE II

This example demonstrates the preparation of a water soluble copolymer which contains 30 weight percent 2-acrylamide-2-methylpropane sulfonic acid. The following amounts of ingredients were employed:

| Ingredients | Amount (Grams) |
| --- | --- |
| N,N—Dimethylacrylamide | 35 |
| Distilled Water | 450 |
| 2-Acrylamide-2-Methyl Propane Sulfonic Acid | 15 |
| Initiator (Ammonium Persulfate) | 0.00999 |

The total amount of distilled water was charged into a Chemco reactor containing a submerged inlet for the injection of nitrogen gas and a cooling-heating coil for injecting liquid nitrogen and steam respectively.

The water was degassed by purging with pure nitrogen and heating at 100° C. for about 15 minutes to eliminate any trace of oxygen followed by cooling to room temperature.

The total amount of N,N-dimethylacrylamide monomer was added to the reactor and cooled to 5° C. followed by the addition of the total amount of 2-acrylamido-2-methylpropane sulfonic acid monomer. The solids content was 10 weight percent.

The injection of pure nitrogen gas was continued for about 15 minutes while the total amount of initiator was added.

The polymerization took place almost instantly and the solution became thick within about 1 hour. The temperature was steady at 5° C.

To be sure that the polymerization was complete, the reaction system was kept at room temperature overnight.

Two 600 ml solutions each containing about 3,000 ppm of the above prepared N,N-dimethylacrylamide/2-acrylamido-2-methyl propane sulfonic acid copolymer were separately prepared directly from the reaction broth by diluting with distilled water and 1.5% brine water, respectively. The broth was dissolved in two stages. First, the thick broth was allowed to swell in water and then allowed to disintegrate into a molecular dispersed solution.

To avoid a severe shear condition, dissolving the copolymer was carried out in a glass jar rotated on a roller. Each dilute polymer solution was then filtered through a 100 mesh stainless steel screen and the viscosity of each solution was measured without aging. The results are set forth in the Table below.

EXAMPLE III

This example demonstrates the preparation of a water soluble copolymer which contains 10 weight percent 2-acrylamido-2-methyl propane sulfonic acid.

The following amounts of ingredients were employed:

| Ingredients | Amount (Grams) |
| --- | --- |
| N,N—Dimethylacrylamide | 45 |
| Distilled Water | 450 |
| 2-Acrylamide-2-Methyl Propane Sulfonic Acid | 5 |
| Initiator (Ammonium Persulfate) | 0.01057 |

A copolymer and two 600 ml solutions containing 3,000 ppm of the copolymer were prepared using substantially the methods of Example II.

The solutions were tested and the results are set forth in the Table.

EXAMPLE IV

This example demonstrates the preparation of a water soluble copolymer which contains 2 weight percent 2-acrylamido-2-methyl propane sulfonic acid. The following amounts of ingredients were employed:

| Ingredients | Amount (Grams) |
| --- | --- |
| N,N—Dimethylacrylamide | 49 |
| Distilled Water | 450 |
| 2-Acrylamide-2-Methyl Propane Sulfonic Acid | 1 |
| Initiator (Ammonium Persulfate) | 0.01015 |

A copolymer and two 600 ml solutions containing 3,000 ppm of the copolymer were prepared using substantially the method of Example II. The solutions were tested and the results are set forth in the Table.

EXAMPLE V

Example IV was repeated with one change—the polymerization temperature was reduced from 5° C. to 0° C.

A copolymer and two solutions containing 3,000 ppm of the copolymer were prepared and tested. The results are set forth in the Table.

EXAMPLE VI

Example IV was repeated with one change—the amount of initiator (ammonium persulfate) was decreased to 0.00114 gram.

A copolymer and two solutions containing 3,000 ppm of the copolymer were prepared and tested. The results are set forth in the Table.

EXAMPLE VII

Example IV was repeated with two changes—the amount of initiator was decreased to 0.00103 gram and the percent solids content for polymerization was increased to 18.

A copolymer and two solutions containing 3,000 ppm of the copolymer were prepared and tested. The results are set forth in the Table.

EXAMPLE VIII

Example IV was repeated with two changes—the solids content for polymerization was increased to 30 percent and the amount of initiator was decreased to 0.002380 gram.

A copolymer and two solutions containing 3,000 ppm of the copolymer were prepared but the solubility of the copolymer in the solutions was poor and the solutions could not be tested.

EXAMPLE IX

Example IV was repeated with four changes—the amount of 2-acrylamido-B 2-methyl propane sulfonic acid monomer was reduced to 1 weight percent, the amount of N,N-dimethyl acrylamide monomer was increased to 99 weight percent, the percent solids content for polymerization was increased to 18.9 and the amount of initiator was decreased to 0.002 gram.

A copolymer and two solutions containing 3,000 ppm of the copolymer were prepared and tested. The results are set forth in the Table.

TABLE

SYNTHESIS AND CHARACTERIZATION OF THE COPOLYMERS AND SOLUTIONS OF EXAMPLE II-IX

| | Synthesis | | | | Characterization | | |
|---|---|---|---|---|---|---|---|
| EXAMPLE NO. | AMPS* WT % | [I] MOLE/ | % SOLIDS CONTENT | TEMP. °C. | POLYMER CONC. (PPM) | VISCOSITY** (CPS) WATER/ BRINE (1.5%) | [n] WATER/ [n] BRINE (1.5%) RATIO |
| II | 30 | $8.8 \times 10^{-5}$ | 10 | 5 | 3,000 | 780/24 | 32.5 |
| III | 10 | $8.8 \times 10^{-5}$ | 10 | 5 | 3,000 | 500/33 | 15.2 |
| IV | 2 | $8.8 \times 10^{-5}$ | 10 | 5 | 3,000 | 59/27 | 2.2 |
| V | 2 | $8.8 \times 10^{-5}$ | 10 | 0 | 3,000 | 88/38 | 2.3 |
| VI | 2 | $8.8 \times 10^{-6}$ | 10 | 0 | 3,000 | 100/42 | 2.4 |
| VII | 2 | $8.8 \times 10^{-6}$ | 18 | 0 | 3,000 | 115/46 | 2.3 |
| VIII | 2 | $8.8 \times 10^{-5}$ | 30 | 0 | 3,000 | Poor Solubility | Poor Solubility |
| IX | 1 | $8.8 \times 10^{-5}$ | 18.9 | 0 | 3,000 | 90/60 | 1.5 |

*2-acrylamido-2-methylpropane sulfonic acid
**measured at 30° C. with Brookfield Viscometer (#1 spindle, 6 rpm)

The above Table illustrates that the water soluble copolymers of this invention exhibit excellent viscosity retention in brine solution.

It is evident from the foregoing that various modifications can be made to this invention. Such, however, are considered as being within the scope of this invention.

We claim:

1. In a process for enhancing petroleum recovery from a subterranean petroleum bearing formation which comprises injecting into the formation through an input well an aqueous composition having dissolved therein a polymeric viscosity control agent whereby petroleum is displaced in the formation toward at least one output well, the improvement comprising using as said agent, a random copolymer having a weight average molecular weight greater than about one million having the formula:

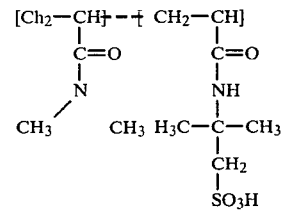

said random copolymer being produced by reacting from about 98 to about 99.5 weight percent N,N-dimethylacrylamide with from about 0.5 to about 2 weight percent 2-acrylamido-2-methylpropane sulfonic acid.

* * * * *